US012618666B2

(12) United States Patent (10) Patent No.: US 12,618,666 B2
Hong et al. (45) Date of Patent: May 5, 2026

(54) ANTENNA ALIGNMENT APPARATUS

(71) Applicant: KOREA RESEARCH INSTITUTE OF STANDARDS AND SCIENCE, Daejeon (KR)

(72) Inventors: Young-Pyo Hong, Sejong-si (KR); Chihyun Cho, Daejeon (KR); Seung-Kwan Kim, Daejeon (KR); Jae-Keun Yoo, Daejeon (KR); No-Weon Kang, Daejeon (KR); In-Ho Bae, Daejeon (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 366 days.

(21) Appl. No.: 18/538,431

(22) Filed: Jan. 25, 2024

(65) Prior Publication Data

US 2025/0174873 A1 May 29, 2025

(30) Foreign Application Priority Data

Nov. 24, 2023 (KR) ........................ 10-2023-0165131

(51) Int. Cl.
*G01B 11/26* (2006.01)
*H01Q 1/12* (2006.01)
(52) U.S. Cl.
CPC .............. *G01B 11/26* (2013.01); *H01Q 1/125* (2013.01)
(58) Field of Classification Search
CPC ................................ G01B 11/26; G01B 11/27
USPC .......................................... 33/286, 613, 645
See application file for complete search history.

(56) References Cited

U.S. PATENT DOCUMENTS

| | | | | |
|---|---|---|---|---|
| 4,684,248 A | * | 8/1987 | Cinzori | G01B 11/272 |
| | | | | 356/141.5 |
| 6,293,027 B1 | * | 9/2001 | Elliott | G01B 11/002 |
| | | | | 33/286 |
| 6,531,992 B1 | * | 3/2003 | Ehrenberg | H01Q 19/13 |
| | | | | 343/915 |
| 6,630,912 B2 | * | 10/2003 | Ehrenberg | H01Q 1/125 |
| | | | | 343/882 |
| 7,130,034 B2 | * | 10/2006 | Barvosa-Carter | G01C 15/002 |
| | | | | 356/128 |
| 7,382,949 B2 | | 6/2008 | Bouma et al. | |

(Continued)

FOREIGN PATENT DOCUMENTS

| | | |
|---|---|---|
| JP | 2015127718 A | 7/2015 |
| KR | 10-2005-0058044 A | 6/2005 |

(Continued)

*Primary Examiner* — George B Bennett
(74) *Attorney, Agent, or Firm* — Central California IP Group, P.C.; Andrew D. Fortney

(57) ABSTRACT

An antenna alignment apparatus includes a first antenna alignment unit. The first antenna alignment unit may include: a flange coupled to a transmit antenna jig providing two-axis rotational motion; a first bearing coupled to the flange; a cylinder inserted into the first bearing to rotate; an optical fiber collimator inserted into and aligned with the cylinder and having a variable focal length; an optical fiber mounted on the optical fiber collimator; and a plurality of screws contacting an external side surface of the optical fiber collimator through an external side surface of the cylinder and aligning a central axis of the optical fiber collimator and a central axis of the cylinder.

16 Claims, 8 Drawing Sheets

(56) References Cited

U.S. PATENT DOCUMENTS

| | | | | |
|---|---|---|---|---|
| 8,201,338 B2 * | 6/2012 | Tsai | ..................... | G01R 29/105 |
| | | | | 33/286 |
| 10,054,427 B2 * | 8/2018 | Shimizu | ................ | G01B 11/14 |
| 11,579,014 B1 * | 2/2023 | Zhang | ................ | H04B 10/118 |
| 11,978,946 B2 | 5/2024 | Yoo et al. | | |
| 12,431,633 B2 * | 9/2025 | Morioka | ............... | H01Q 19/06 |
| 2006/0093276 A1 | 5/2006 | Bouma et al. | | |
| 2022/0029270 A1 | 1/2022 | Yoo et al. | | |
| 2022/0254753 A1 * | 8/2022 | Lee | ....................... | B41M 3/006 |
| 2022/0363520 A1 * | 11/2022 | Kamimura | ........... | E02F 3/3681 |

FOREIGN PATENT DOCUMENTS

| KR | 10-2010-0060700 A | 6/2010 | | |
|---|---|---|---|---|
| KR | 101065479 B1 * | 9/2011 | ............ | G01R 29/10 |
| KR | 10-1322416 B1 | 10/2013 | | |
| KR | 20200119699 A | 10/2020 | | |

* cited by examiner

ANTENNA ALIGNMENT APPARATUS

CROSS-REFERENCE TO RELATED APPLICATIONS

This U.S. non-provisional patent application claims priority under 35 U.S.C. § 119 to Korean Patent Application 10-2023-0165131, filed on Nov. 24, 2023, in the Korean Intellectual Property Office, the entire contents of which are hereby incorporated by reference.

TECHNICAL FIELD

The present disclosure relates to an antenna alignment apparatus, and more particularly, to an antenna alignment apparatus for aligning an antenna using an optical device.

BACKGROUND

An antenna is a device disposed at the end of a wireless communication system, and antenna characteristics such as gain, polarization, and radiation pattern are key factors affecting the overall performance of a wireless communication system. Therefore, the development of techniques for precisely evaluating antenna characteristics is actively underway.

Far-field and near-field measurement methods are used to evaluate antenna characteristics. Such measurement methods use an antenna under test (AUT) as either a transmit antenna for radiating electromagnetic waves generated from a signal source and a receive antenna for receiving the radiated electromagnetic waves.

In the case of far-field measurement method, a separation distance between two antennas should be large enough to satisfy far-field conditions of antennas. In the case of near-field measurement method, a separation distance is less than the separation distance of the far-field measurement method but more than several wavelengths should be secured.

To obtain accurate antenna characteristics, reference planes of transmit and receive antennas should be aligned to be parallel to each other and to place centers of the two reference planes on the same axis. In some cases, an antenna aperture is used as a reference plane for antenna alignment. However, it may be difficult to align apertures of the two antennas having a separation distance, and an electrically or optically complex and expensive antenna alignment system is required to align the apertures of the two antennas.

In addition, an antenna is often covered with a radome used as a cover to protect the antenna, so that an aperture of the antenna is inaccessible. In this case, characteristics of the antenna should be evaluated by selecting a different mechanical reference plane other than the aperture.

An antenna alignment method using an electrical method is disclosed in Korean Patent Publication No. 10-2005-0058044. The antenna alignment method is a method using vertical polarization and horizontal polarization of a radio-frequency (RF) signal received by a receive antenna. The antenna alignment method requires equipment such as an amplitude/phase detector and an amplitude/phase comparator, and alignment accuracy is reduced when a signal-to-noise ratio (SNR) of the RF signal measured at the receive antenna is low.

An antenna alignment method using an optical method is also disclosed in Korean Patent Publication No. 10-2010-0060700. In the antenna alignment method disclosed in Korean Patent Publication No. 10-2010-0060700, apertures of a transmit antenna and a receive antenna are used as alignment reference planes, and a distance and an angle between the transmit antenna and the receive antenna are calculated using laser and the transmit or receive antenna is aligned based on the calculated location information. The above method is difficult to precisely measure three types of information of a distance, an elevation angle, and an azimuth angle, which are similar to those of a three-dimensional laser measuring device. This makes precise alignment difficult.

In addition, an antenna alignment apparatus measures a distance using laser reflected from edges of apertures of a transmit antenna and a receive antenna. Therefore, it may be difficult to measure the distance using the reflected laser, and an error may occur in the measured distance due to a change in shape of the edges of the apertures.

The present inventor provided an antenna alignment apparatus aligning an antennas using a light source unit in Korean Registered Patent (No. 10-1322416 B1). However, Korean Registered Patent (KR 10-1322416 B1) has difficulty in aligning an optical axis of a light source of a first antenna alignment unit and a center axis of a housing.

SUMMARY

An aspect of the present disclosure is to provide easy alignment of an antenna by adding a bearing structure and a laser focal length adjustment structure.

Another aspect of the present disclosure is to provide initial alignment by mounting a first antenna alignment apparatus on a dummy mast and rotating an optical fiber collimator with a bearing structure to match central axes of the first antenna alignment apparatus and the optical fiber collimator.

Another aspect of the present disclosure is to provide alignment of an elevation angle and an azimuth angle of a transmitting antenna jig, by mounting a first antenna alignment apparatus on the transmitting antenna jig, mounted on the receiving antenna mast to be rotatable through a bearing, and rotating the transmitting antenna jig through a bearing structure.

Another aspect of the present disclosure is to control laser beam to converge at a single point by mounting a first antenna alignment apparatus on a transmitting antenna jig, mounted on a receiving antenna mast to be rotatable through a bearing, and adjusting a focal length of an optical fiber collimator of the first antenna alignment apparatus.

An antenna alignment apparatus according to an example embodiment includes a first antenna alignment unit. The first antenna alignment unit may include: a flange coupled to a transmit antenna jig providing two-axis rotational motion; a first bearing coupled to the flange; a cylinder inserted into the first bearing to rotate; an optical fiber collimator inserted into and aligned with the cylinder and having a variable focal length; an optical fiber mounted on the optical fiber collimator; and a plurality of screws contacting an external side surface of the optical fiber collimator through an external side surface of the cylinder and aligning a central axis of the optical fiber collimator and a central axis of the cylinder.

In an example embodiment, the optical fiber collimator may include: a first cylinder; a second cylinder connected to the first cylinder and having an aligned central axis; a first lens disposed inside the first cylinder; a second lens disposed inside the second cylinder; and an optical fiber adapter disposed at one end of the first cylinder. The optical fiber may have one end mounted on the optical fiber adapter.

In an example embodiment, the end of the optical fiber may be disposed at a focus of the first lens.

In an example embodiment, a distance between the first cylinder and the second cylinder may be variable.

In an example embodiment, the antenna alignment apparatus may further include: a third cylinder disposed between the first cylinder and the second cylinder. One of the first cylinder and the second cylinder may have a variable distance from the third cylinder.

In an example embodiment, the antenna alignment apparatus may further include a second antenna alignment unit disposed to be spaced apart from the optical fiber collimator. The second antenna alignment unit may include: a reflector disposed to be perpendicular to a central axis of the optical fiber collimator; and a reflector support portion supporting the reflector.

In an example embodiment, the antenna alignment apparatus may further include: a transmit antenna mast; a transmit antenna jig coupled to the transmit antenna mast; and a bearing by which the transmit antenna jig provides rotational motion to the transmit antenna mast.

In an example embodiment, the antenna alignment apparatus may further include: a receive antenna mast; and a receive antenna jig coupled to the receive antenna mast. The second antenna alignment unit may be disposed at the receive antenna jig.

An antenna alignment method of an antenna alignment apparatus including a first antenna alignment unit and a second antenna alignment unit is provided. The first antenna alignment unit may include: a flange coupled to a transmit antenna jig; a first bearing coupled to the flange; a cylinder inserted into the first bearing to rotate; an optical fiber collimator inserted into and aligned with the cylinder and having a variable focal length; and a plurality of screws contacting an external side surface of the optical fiber collimator through an external side surface of the cylinder and aligning a central axis of the optical fiber collimator and a central axis of the cylinder with each other. The second antenna alignment unit may include: a reflector disposed to be perpendicular to a central axis of the optical fiber collimator; and a reflector support portion supporting the reflector. The antenna alignment method may include: coupling the flange of the first antenna alignment unit to a transmit antenna jig; and initially aligning the flange and the transmit antenna jig with each other by adjusting the screws to match a trajectory of laser beam of the optical fiber collimator with a central axis of the cylinder while rotating the cylinder.

In an example embodiment, the antenna alignment method may further include: coupling the first antenna alignment unit and the transmit antenna jig, initially aligned with each other, to the transmit antenna mast; checking trajectory of laser beam of the optical fiber collimator while rotating the transmit antenna jig coupled to the transmit antenna mast through a bearing; controlling an elevation angle and an azimuth angle of the transmit antenna jig such that the trajectory of the laser beam of the optical fiber collimator is disposed in a center of the reflector; varying a focal length of the optical fiber collimator such that the laser beam of the optical fiber collimator is focused in the center of the reflector; and controlling an elevation angle and an azimuth angle of a receive antenna jig on which the reflector is mounted to provide reflected light, reflected from the reflector, to the optical fiber collimator.

In an example embodiment, the antenna alignment method may further include: removing the first antenna alignment unit from the transmit antenna jig and attaching the transmit antenna reference plane transfer jig, to which the transmit antenna is attached, to the transmit antenna jig; removing the second antenna alignment unit from the receive antenna jig and attaching the receive antenna reference plane transfer jig, to which the receive antenna is attached, to the receive antenna jig; and providing an electrical signal to the transmit antenna to radiate electromagnetic waves, and receiving the electromagnetic waves from the receive antenna and converting the received electromagnetic waves into electrical signals.

An antenna alignment apparatus according to an example embodiment includes: a transmit antenna mast; a transmit antenna jig coupled to the transmit antenna mast and providing two-axis rotational motion; a bearing mounted on the transmit antenna mast and providing rotational motion of the transmit antenna jig with respect to the transmit antenna mast; a receive antenna mast; and a receive antenna jig coupled to the receive antenna mast and providing two-axis rotational motion.

In an example embodiment, the transmit antenna jig may change a first elevation angle and a first azimuth angle, and the receive antenna jig may change a second elevation angle and a second azimuth angle.

In an example embodiment, the antenna alignment apparatus may further include a first antenna alignment unit mounted on the transmit antenna jig. The first antenna alignment unit may include: a flange coupled to a transmit antenna jig providing two-axis rotational motion; a first bearing coupled to the flange; a cylinder inserted into the first bearing to rotate; an optical fiber collimator inserted into and aligned with the cylinder and having a variable focal length; an optical fiber mounted on the optical fiber collimator; and a plurality of screws contacting an external side surface of the optical fiber collimator through an external side surface of the cylinder and aligning a central axis of the optical fiber collimator and a central axis of the cylinder.

In an example embodiment, the antenna alignment apparatus may further include a second antenna alignment unit mounted on the receive antenna jig. The second antenna alignment unit may include: a reflector disposed to be perpendicular to a central axis of the optical fiber collimator; and a reflector support portion supporting the reflector.

In an example embodiment, the antenna alignment apparatus may further include: a transmit antenna reference plane transfer jig coupled to the transmit antenna jig; a transmit antenna coupled to the transmit antenna reference plane transfer jig; a receive antenna reference plane transfer jig coupled to the receive antenna jig; and a receive antenna coupled to the receive antenna reference plane transfer jig.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
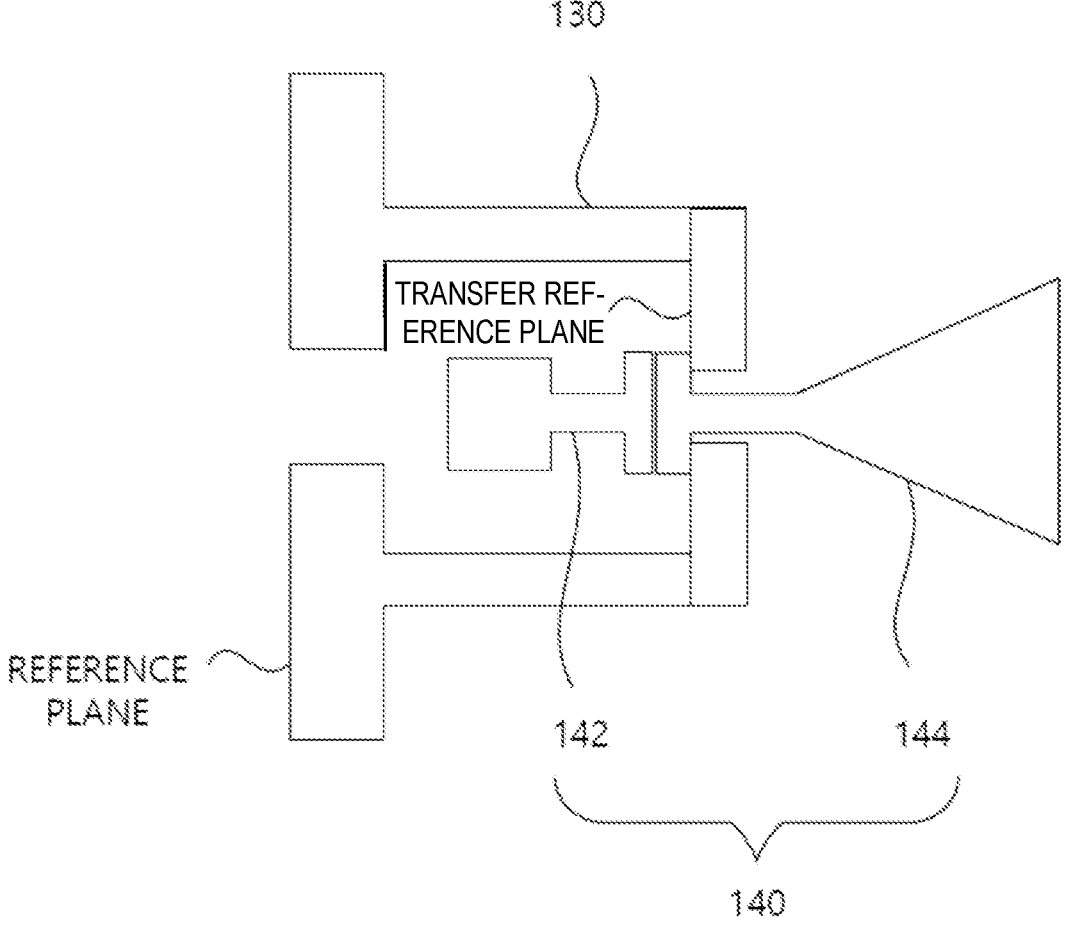
FIG. 1 is a diagram illustrating a transmit antenna and a transmit antenna reference plane transfer jig in according to an example embodiment of the present disclosure.

To precisely measure antenna characteristics, reference planes of a transmit antenna and a receive antenna should be aligned to be parallel to each other. In general, to measure characteristics (a gain and a radiation pattern) of an antenna, the reference planes of the transmit antenna and the receive antenna are adjusted to be parallel to each other, centers of the transmit antenna and the receive antenna are aligned to match each other, and the antenna characteristics are then measured.

Hereinafter, example embodiments will now be described more fully with reference to the accompanying drawings, in which some example embodiments are shown. Example embodiments may, however, be embodied in many different forms and should not be construed as being limited to the embodiments set forth herein. Rather, these example embodiments are provided so that this disclosure will be thorough and complete, and will fully convey the scope of example embodiments of the present disclosure to those of ordinary skill in the art. In the drawings, the thicknesses of layers and regions are exaggerated for clarity.

Like reference characters and/or numerals in the drawings denote like elements.

FIG. 1 is a diagram illustrating a transmit antenna and a transmit antenna reference plane transfer jig according to an example embodiment.

Referring to FIG. 1, a reference plane of the transmit antenna 144 or the receive antenna 244 may employ a waveguide face, an aperture of the transmit antenna 144, or a mechanical reference plane. In general, the reference plane employs a mechanical reference plane or an antenna aperture. A coaxial-waveguide converter 142 may be coupled to the transmit antenna 144. The coaxial-waveguide converter 242 may be coupled to the receive antenna 244.

A reference plane may be formed using a transmit antenna reference plane transfer jig 130 or a receive antenna reference plane transfer jig 230, capable of securing parallelism of a reference plane and a transfer reference plane.

Figure 2:
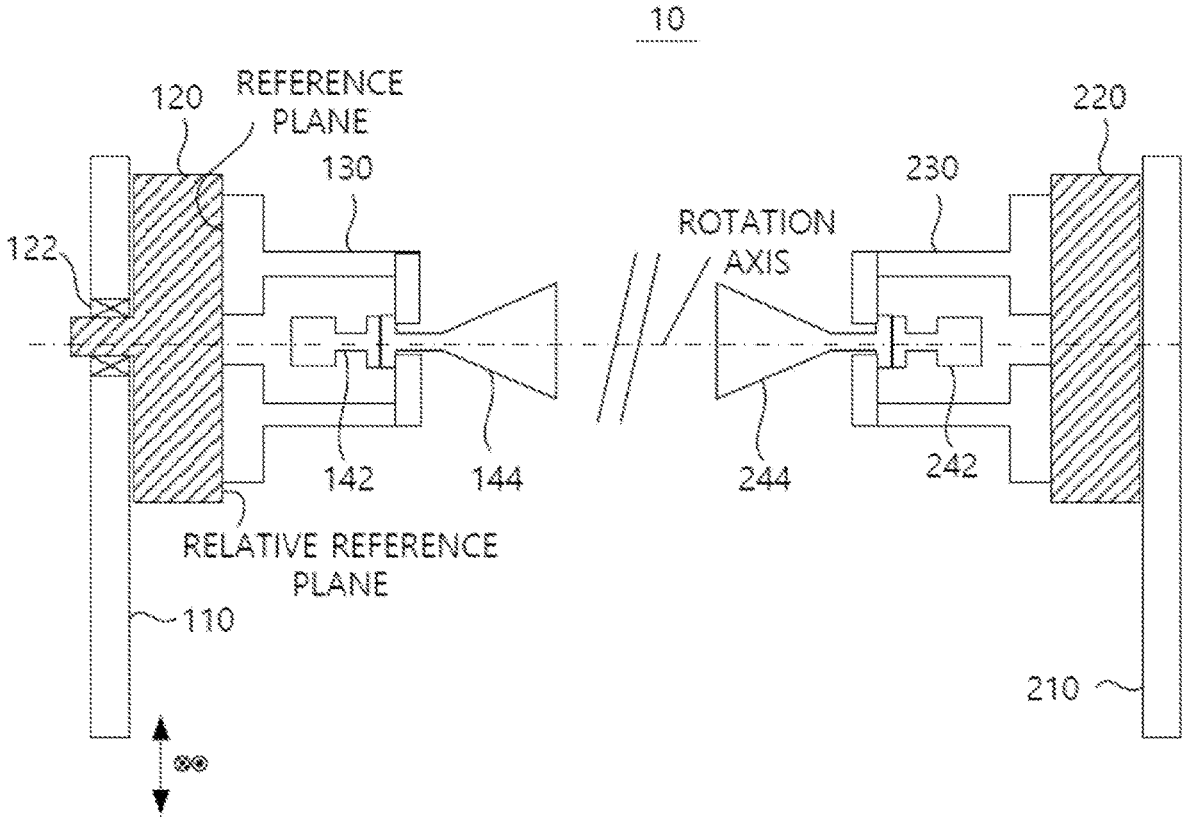
FIG. 2 is a conceptual diagram illustrating an antenna alignment apparatus according to an example embodiment of the present disclosure.

FIG. 2 is a conceptual diagram illustrating an antenna alignment apparatus according to an example embodiment.

Referring to FIG. 2, an antenna alignment apparatus 10 may include a transmit antenna mast 110, a transmit antenna jig 120 coupled to the transmit antenna mast 110 and providing two-axis rotational motion, a bearing 122 mounted on the transmit antenna mast 110 and providing rotational motion of the transmit antenna jig 120 with respect to the transmit antenna mast 110, a receive antenna mast 210, and a receive antenna jig 220 coupled to the receive antenna mast 210 and providing two-axis rotational motion.

The transmit antenna mast 110 may have a height of several meters or more. A distance between the transmit antenna 144 and the receive antenna 244 may be several meters to tens of meters. Accordingly, an antenna alignment apparatus for aligning the reference planes of the two antennas 144 and 244 at such a large height and such a long distance is required.

The transmit antenna jig 120 may change a first elevation angle and a first azimuth angle. The transmit antenna jig 120 may be a two-axis rotation stage. The transmit antenna jig 120 may have a relative reference plane. The transmit antenna jig 120 may additionally include a two-axis linear motion stage moving linearly in an X-axis and Y-axis. A height of the transmit antenna jig 120 may be adjusted by moving up and down along the transmit antenna mast 110, and the transmit antenna jig 120 may be moved left and right by mounting wheels on a bottom of a mast.

The bearing 122 may be coupled between the transmit antenna jig 120 and the transmit antenna mast 110 to provide rotational motion to the transmit antenna jig 120. The bearing 122 may be inserted into a hole formed in the transmit antenna mast 110. The transmit antenna jig 120 may have a central axis, and the central axis of the transmit antenna jig 120 may be inserted into the bearing 122.

The transmit antenna reference plane transfer jig 130 may be coupled to the transmit antenna jig 120. The transmit antenna reference plane transfer jig 130 may have the same reference plane as the relative reference plane of the transmit antenna jig 120. The transmit antenna reference plane delivery jig 130 may provide a transfer reference plane to the transmit antenna 144.

The transmit antenna 144 may be coupled to the transmit antenna reference plane transfer jig 130. The transmit antenna 144 may have the same plane as the transfer reference plane.

The coaxial-waveguide converter 142 may be coupled to the transmit antenna 144. The coaxial-waveguide converter 144 may supply radio-frequency (RF) power to the transmit antenna 144.

The receive antenna mast 210 may have a height of several meters or more. A distance between the transmit antenna 144 and the receive antenna 244 may be several meters to tens of meters.

The receive antenna jig 220 may change a second elevation angle and a second azimuth angle. The receive antenna jig 220 may be a two-axis rotation stage. The receive antenna jig 220 may have a relative reference plane. The receive antenna jig 220 may additionally include a two-axis linear motion stage providing linear motion in the X-axis and the Y-axis.

The receive antenna reference plane transfer jig 230 may be coupled to the receive antenna jig 220. The receive antenna reference plane transfer jig 230 may have the same reference plane as the relative reference plane of the receive antenna jig 220. The receive antenna reference plane transfer jig 230 may provide a transfer reference plane to the receive antenna 244.

The receive antenna 244 may be coupled to the receive antenna reference plane transfer jig 230. The receive antenna 244 may have the same plane as the transfer reference plane.

The coaxial-waveguide converter 242 may be coupled to the receive antenna 244. The coaxial-waveguide converter 244 may convert an RF signal, received by the receive antenna 244, into an electrical signal.

Figure 3:
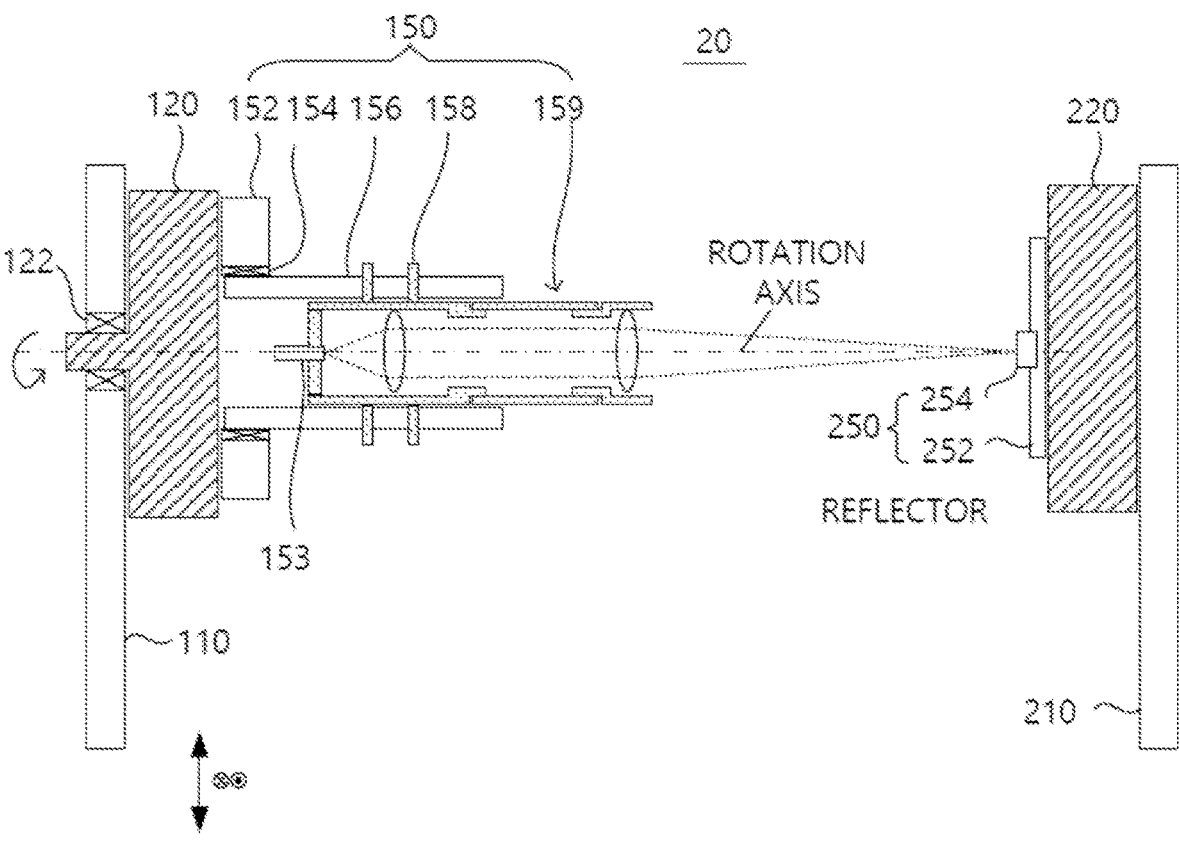
FIG. 3 is a conceptual diagram illustrating an antenna alignment apparatus according to an example embodiment of the present disclosure.

FIG. 3 is a conceptual diagram illustrating an antenna alignment apparatus according to an example embodiment of the present disclosure.

Figure 4:
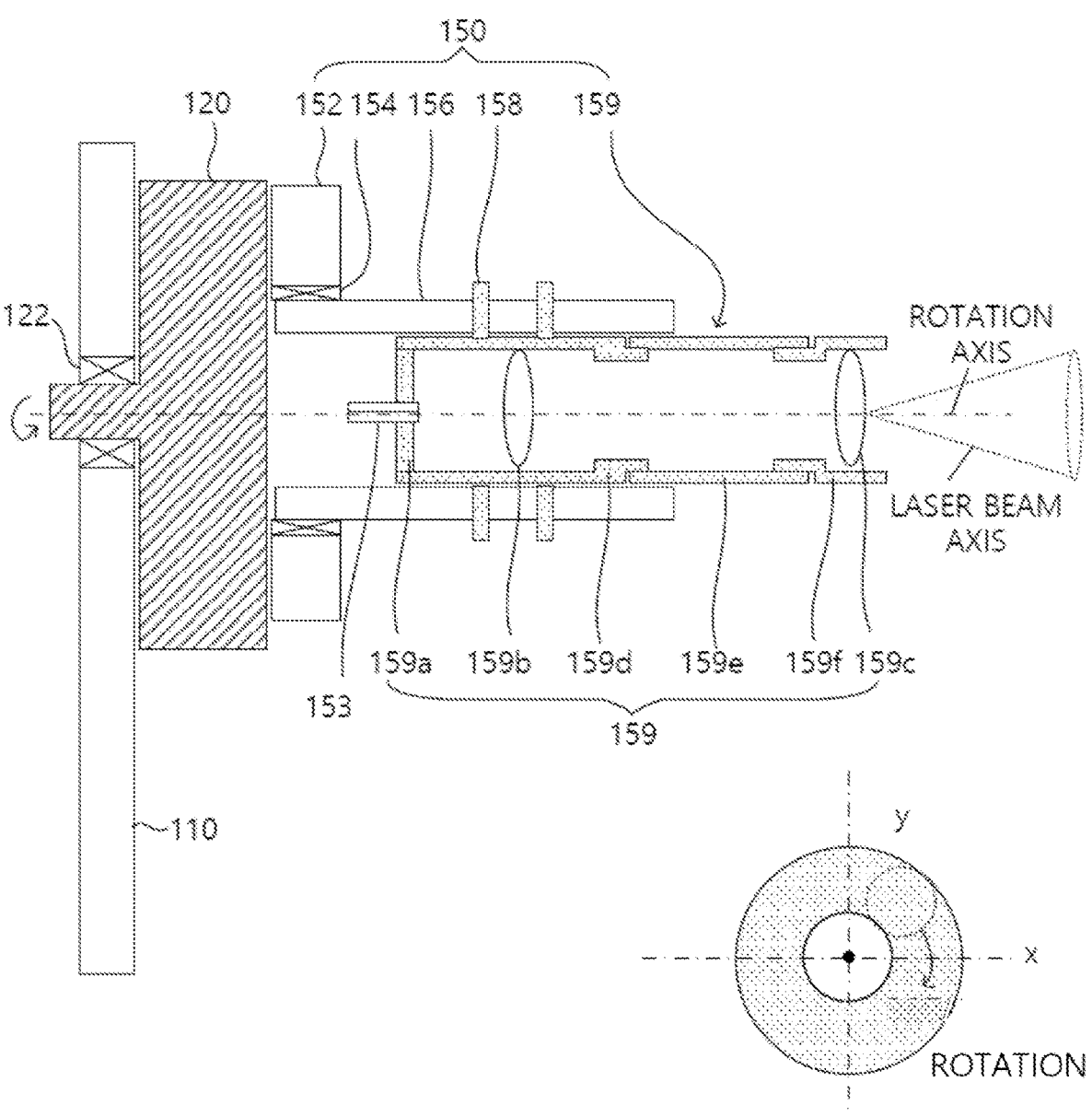
FIG. 4 is a conceptual diagram illustrating an antenna alignment apparatus according to an example embodiment of the present disclosure.

FIG. 4 is a conceptual diagram illustrating an antenna alignment apparatus according to an example embodiment of the present disclosure.

Referring to FIGS. 3 and 4, an antenna alignment apparatus 20 may include a transmit antenna mast 110, a transmit antenna jig 120 coupled to the transmit antenna mast 110 and providing two-axis rotational motion, a bearing 122 mounted on the transmit antenna mast 110 and providing rotational motion of the transmit antenna jig 120 with respect to the transmit antenna mast 110, a receive antenna mast 210, and a receive antenna jig 220 coupled to the receive antenna mast 210 and providing two-axis rotational motion.

A first antenna alignment unit 150 may be mounted on the transmit antenna jig 210.

The first antenna alignment unit 150 may include a flange 152 coupled to the transmit antenna jig 220 providing two-axis rotational motion, a first bearing 154 coupled to the flange 152, a cylinder 156 inserted into the first bearing 154 to rotate, an optical fiber collimator 159 inserted into and aligned with the cylinder 156 and having a variable focal length, an optical fiber 153 mounted on the optical fiber collimator 159, and a plurality of screws 158 contacting an external side surface of the optical fiber collimator 159 through an external side surface of the cylinder 156 and aligning a central axis of the optical fiber collimator 159 and a central axis of the cylinder 156.

The flange 152 may be disk-shaped, and may have a plurality of fastening holes on a circle having a predetermined radius. The flange 152 may be coupled to the transmit antenna jig 120 through the fastening hole.

The first bearing 154 may be disposed to be inserted into a through-hole formed in the center of the flange 152. The first bearing 152 may provide rotational motion between the flange 152 and the cylinder 156.

The cylinder 156 may be inserted into the first bearing 154. The optical fiber collimator 159 may be inserted into the cylinder 156 to be fixed thereto.

The plurality of screws 158 may be disposed on an external side surface of the cylinder 156 to align the central axis of the cylinder 156 and the central axis of the optical fiber collimator 159 with each other. The screws 158 may include three screws disposed on a first cross-section and three screws disposed on a second cross-section spaced apart from the first cross-section.

The transmit antenna jig 120 may rotate through the bearing 122 to confirm that the central axis of the transmit antenna jig 120 and the central axis of the optical fiber collimator 159 are aligned with each other. As the transmit antenna jig 120 rotates, the laser beam (the central axis of the optical fiber collimator 159) may draw a circular trajectory on a plane of the receive antenna (or a plane of a second antenna alignment unit). The transmit antenna jig 120 may adjust an elevation angle and an azimuth angle. By controlling the elevation angle and the azimuth angle, the transmit antenna jig 120 may allow the laser beam (the central axis of the optical fiber collimator 159) to provide a single point in the plane of the second antenna alignment unit.

The optical fiber collimator 159 may include a first cylinder 159d, a second cylinder 159f connected to the first cylinder 159d and having an aligned central axis, a first lens 159b disposed inside the first cylinder 159d, a second lens 159c disposed inside the second cylinder 159f, and an optical fiber adapter 159a disposed at one end of the first cylinder 159d.

The optical fiber 153 may have one end mounted on the optical fiber adapter 159a. The end of the optical fiber 153 may be disposed at a focus of the first lens 159b. A distance between the first cylinder 159d and the second cylinder 159f may be varied.

The first cylinder 159d may be aligned by the screws 158. The optical fiber adapter 159a may be mounted on the end of the first cylinder 159d. The end of the optical fiber 153 may be coupled to the optical fiber adapter 159a. The optical fiber 153 may transmit light output from a light source.

The first lens 159b may be disposed inside the first cylinder 159d, and one end of the optical fiber 153 may be disposed at a focus of the first lens 159b. Accordingly, light radiated to the optical fiber 153 may be converted into parallel light by the first lens 159b.

The second cylinder 159f may be spaced apart from the first cylinder 159d, and a gap therebetween may be variable. The second cylinder 159f may include the second lens 159c therein. Parallel light, passing through the first lens 159b, may be focused through the second lens 159c. A focal length of the second lens 159c may be several meters to tens of meters. The second antenna alignment unit 250 may be disposed at a focus of the second lens 159c.

A third cylinder 159e may be disposed between the first cylinder 159d and the second cylinder 159f to vary the distance between the first cylinder 159d and the second cylinder 159f. One of the first and second cylinders 159d and 159f may have a variable distance from the third cylinder 159e.

The second antenna alignment unit 250 may be mounted on the receive antenna jig 220. The receive antenna jig 220 may provide two-axis rotational motion to change an elevation angle and an azimuth angle.

The second antenna alignment unit 250 may include a reflector 254, disposed to be perpendicular to a central axis of the optical fiber collimator 159, and a reflector support portion 252 supporting the reflector 254.

The second antenna alignment unit 250 may include a reflector 254 disposed to be perpendicular to a central axis of the optical fiber collimator 159; and a reflector support portion 252 supporting the reflector 254.

The reflector support portion 252 may be a means for fixing the reflector 254 to the receive antenna jig. Laser beam, incident on the reflector 254, may be reflected in an arbitrary direction depending on the elevation angle and the azimuth angle of the receive antenna jig 220.

When a plane of the reflector 254 is perpendicular to the plane of the reflector 254 by adjusting the elevation angle and the azimuth angle of the receive antenna jig 220, the laser beam reflected from the reflector 254 may reach the optical fiber collimator 159.

Figure 5:
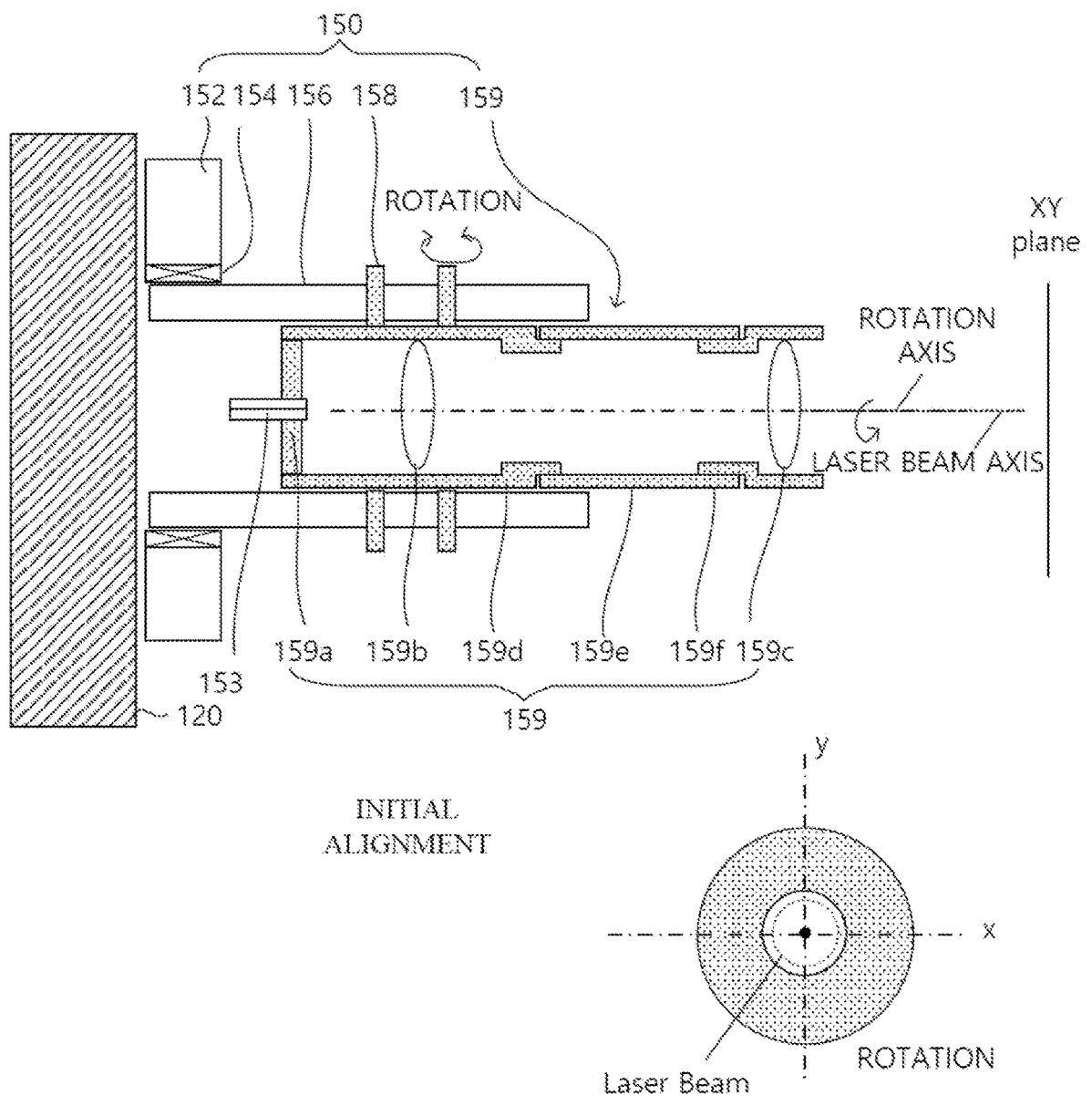
FIG. 5 is a conceptual diagram illustrating an antenna alignment apparatus according to an example embodiment of the present disclosure.

FIG. 5 is a conceptual diagram illustrating an antenna alignment apparatus according to an example embodiment of the present disclosure.

Referring to FIG. 5, the first antenna alignment unit 150 should align an optical fiber collimator 159 in advance to emit laser from a rotation center axis. Screws 158 of the first antenna alignment unit 150 may be adjusted such that a reference plane of the first antenna alignment unit 150 is perpendicular to laser beam.

The antenna alignment apparatus 20 may include a first antenna alignment unit 150 and a second antenna alignment unit 250.

The first antenna alignment unit 150 may include a flange 152 coupled to a transmit antenna jig 120, a first bearing 154 coupled to the flange 152, a cylinder 156 inserted into the first bearing 154 to rotate, an optical fiber collimator 159 inserted into and aligned with the cylinder 156 and having a variable focal length, and a plurality of screws 158 contacting an external side surface of the optical fiber collimator 159 through an external side surface of the cylinder 156 and aligning a central axis of the optical fiber collimator 159 and a central axis of the cylinder 156 with each other.

The optical fiber collimator may include a first cylinder 159d, a second cylinder 159f connected to the first cylinder 159d and having an aligned central axis, a first lens 159b disposed inside the first cylinder 159d, a second lens 159c disposed inside the second cylinder 159f, and an optical fiber adapter 159a disposed at one end of the first cylinder 159d.

The optical fiber 153 may have one end mounted on the optical fiber adapter 159a. The end of the optical fiber 153 may be disposed at a focus of the first lens 159b.

The second antenna alignment unit 250 may include a reflector 254, disposed to be perpendicular to a central axis of the optical fiber collimator 159, and a reflector support portion 252 supporting the reflector 254.

An antenna alignment method of the antenna alignment apparatus may include coupling the flange 152 of the first antenna alignment unit 150 to a transmit antenna jig 120 to be initially aligned with each other by adjusting the screws 158 to match a trajectory of laser beam of the optical fiber collimator 159 with a central axis of the cylinder 156 while rotating the cylinder 156.

When laser of the first antenna alignment unit 150 (the central axis of the optical fiber collimator 159) does not match the rotation axis of the cylinder 156, laser beam focused on the second antenna alignment unit 250 may draw a large circle as the cylinder 156 rotates. To perform the initial alignment, the laser of the first antenna alignment section (the central axis of the fiber collimator 159) and the rotation axis of the cylinder 156 match each other using the screws 158.

According to a modified embodiment, the first antenna alignment unit 150 and a dummy jig (not illustrated) may be coupled to each other, and then be initially aligned with each other by adjusting the screws 158 to match trajectory of laser beam of the optical fiber collimator 159 with the central axis of the cylinder 156 while rotating the cylinder 156.

Figure 6:
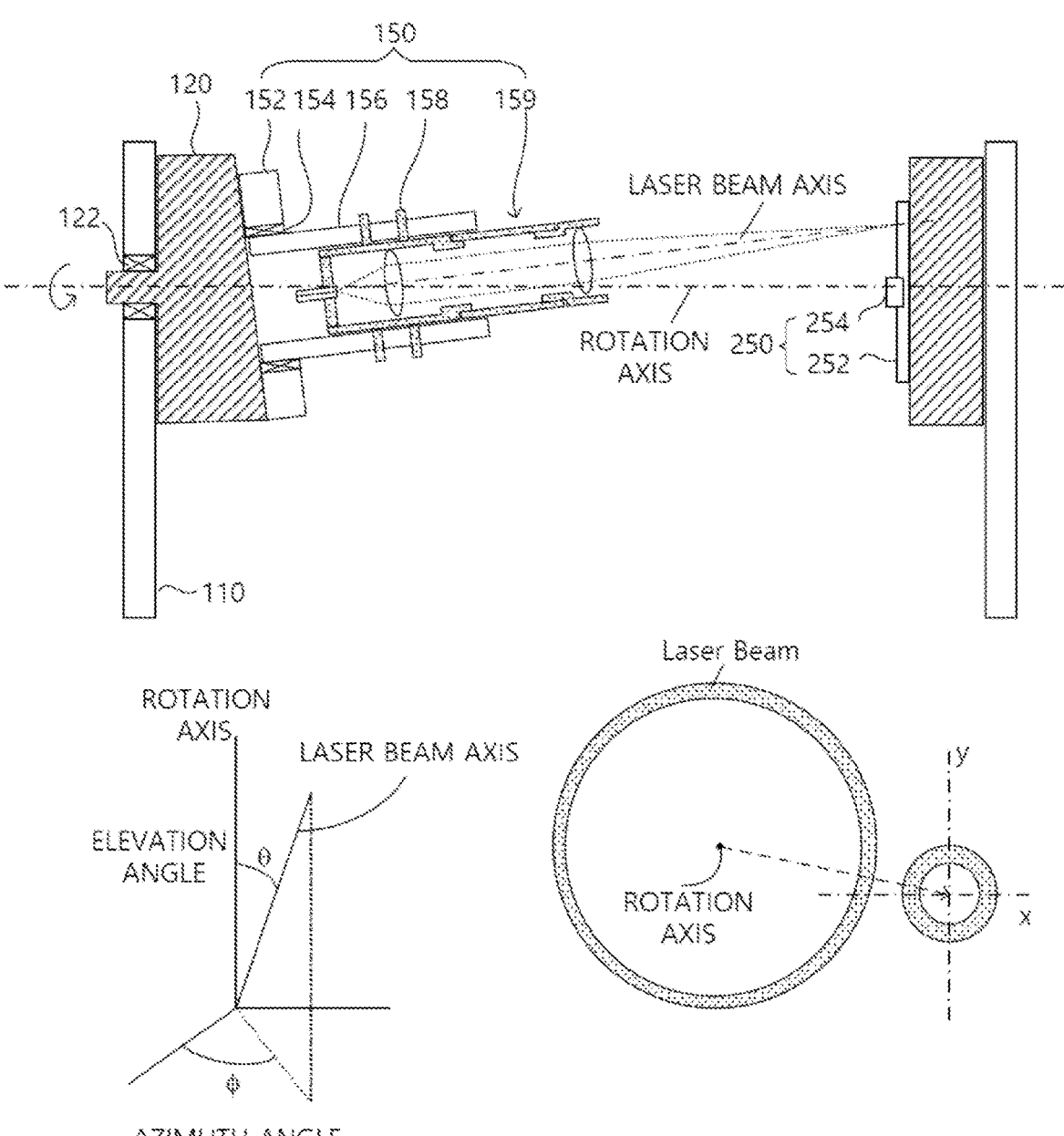
FIGS. 6 and 7 are conceptual diagrams illustrating an antenna alignment apparatus according to an example embodiment of the present disclosure.
Figure 7:
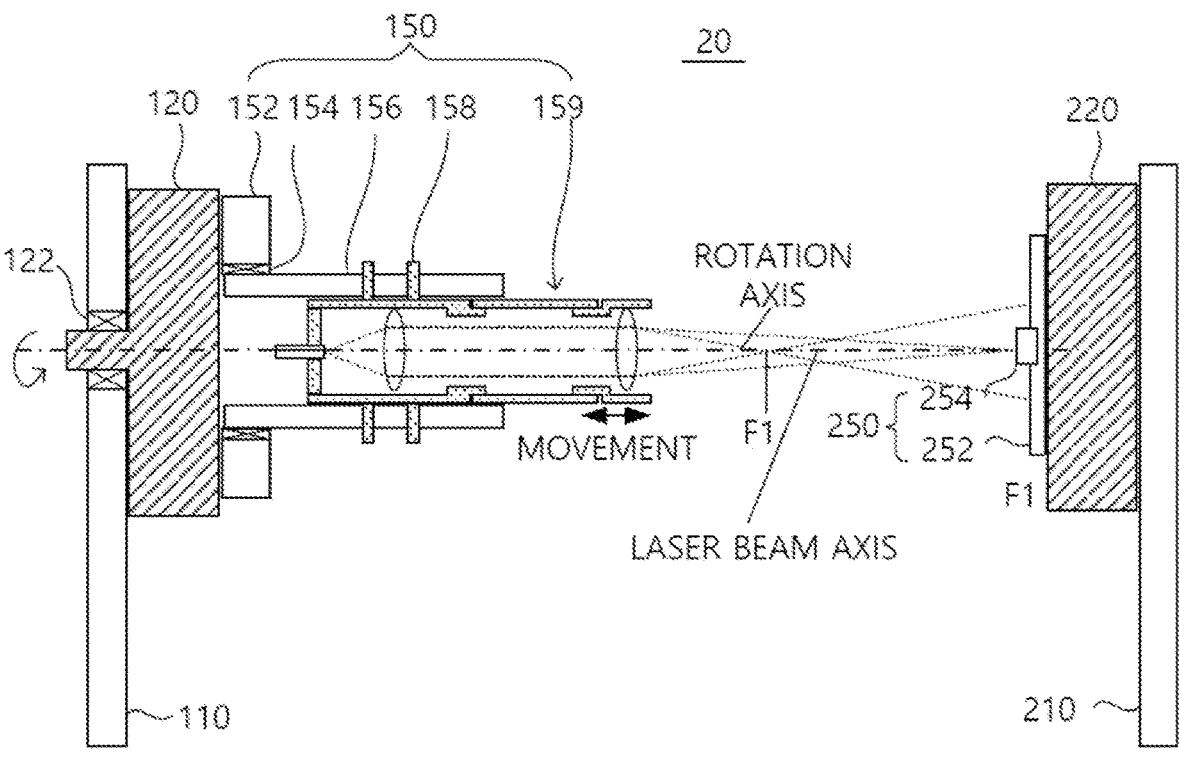
Figure 8:
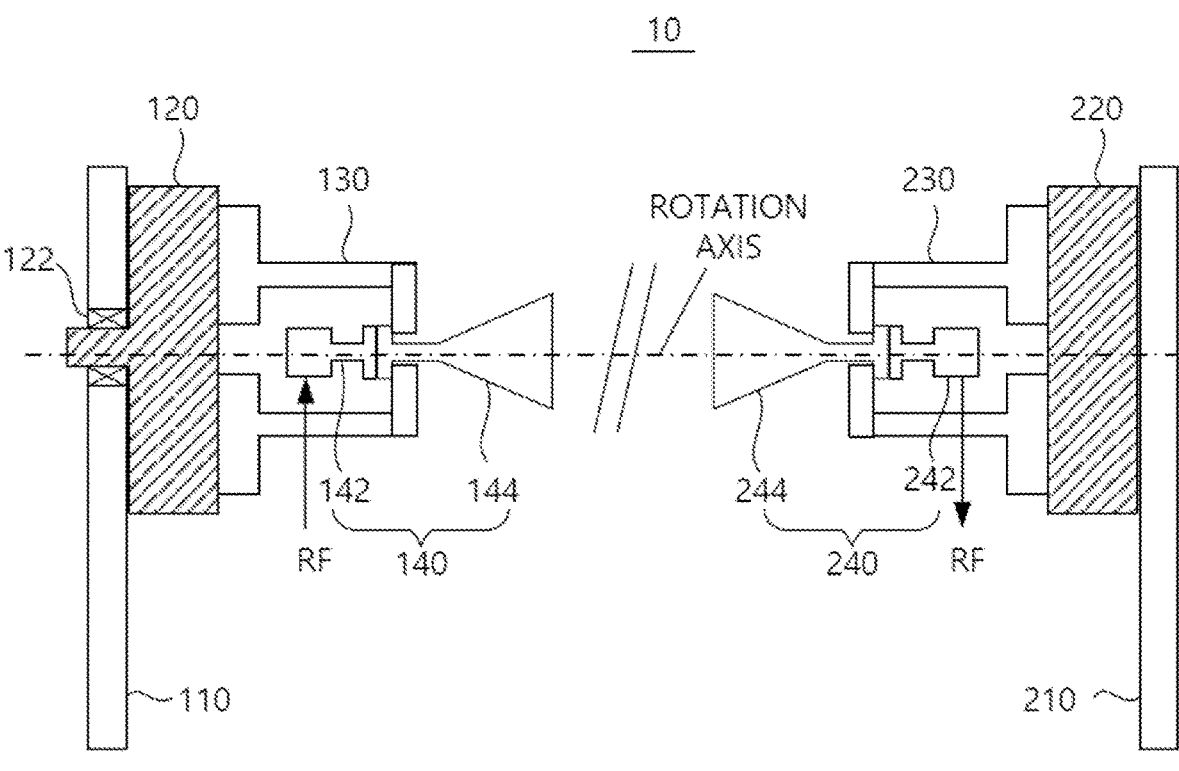
FIG. 8 is a conceptual diagram illustrating an antenna alignment apparatus and method according to an example embodiment of the present disclosure.

FIGS. 6, 7, and 8 are conceptual diagrams illustrating an antenna alignment apparatus according to an example embodiment.

Referring to FIGS. 6, 7, and 8, an antenna alignment apparatus may include a first antenna alignment unit 150 and a second antenna alignment unit 250.

The first antenna alignment unit 150 may include a flange 152, a first bearing 154 coupled to the flange 152, a cylinder 156 inserted into the first bearing 156 to rotate, an optical fiber collimator 159 inserted into and aligned with the cylinder 156 and having a variable focal length, and a plurality of screws 158 contacting an external side surface of the optical fiber collimator 159 through an external side surface of the cylinder 156 and aligning a central axis of the optical fiber collimator 159 and a central axis of the cylinder 156 with each other.

The second antenna alignment unit 250 may include a reflector 254, disposed to be perpendicular to the central axis of the optical fiber collimator 159, and a reflector support portion 252 supporting the reflector 254.

An antenna alignment method may include coupling the flange 152 of the first antenna alignment unit 150 to a transmit antenna jig 120 and initially aligning the flange 152 and the transmit antenna jig 120 by adjusting the screws 158 to match trajectory of laser beam of the optical collimator 159 with the central axis of the cylinder 156 while rotating the cylinder 156.

Referring to FIG. 6, the antenna alignment method may include coupling the first antenna alignment unit 150 and the transmit antenna jig initially aligned with each other to the transmit antenna mast 110, checking trajectory of laser beam of the optical fiber collimator 159 while rotating the transmit antenna jig 120 coupled to the transmit antenna mast 110 through a bearing 122, and controlling an elevation angle and an azimuth angle of the transmit antenna jig 120 such that the trajectory of the laser beam of the optical fiber collimator 159 is disposed in a center of the reflector 254.

Referring to FIG. 7, the antenna alignment method may include varying a focal length of the optical fiber collimator 159 such that the laser beam of the optical fiber collimator 159 is focused in the center of the reflector 254.

The laser beam is focused at a predetermined distance. When laser beam is used at a long distance, it passes through a focal length of the laser beam. Therefore, a size of laser beam generated around the reflector 254 may be significantly increased. In this case, the significantly increased size of the laser beam may cause difficulty in aligning an antenna through rotation of the rotation axis of the transmit antenna jig. When a focal length adjustment structure is added, a size of laser beam projected even at a desired long distance may be reduced to an appropriate size to facilitate the antenna alignment.

The antenna alignment method may include controlling an elevation angle and an azimuth angle of the receive antenna jig 220 on which the reflector is disposed to provide reflected light reflected from the reflector 254 to the optical fiber collimator 159.

Referring to FIG. 8, the antenna alignment method may include removing the first antenna alignment unit 150 from the transmit antenna jig 120 and attaching the transmit antenna reference plane transfer jig 130, to which the transmit antenna 144 is attached, to the transmit antenna jig 120; removing the second antenna alignment unit 250 from the receive antenna jig 220 and attaching the receive antenna reference plane transfer jig 230, to which the receive antenna 244 is attached, to the receive antenna jig 220; and providing an electrical signal to the transmit antenna 144 to radiate electromagnetic waves, and receiving the electromagnetic waves from the receive antenna 244 and converting the received electromagnetic waves into electrical signals.

According to a modified embodiment, the optical fiber collimator 159 may include a first lens, a second lens, and a third lens. One end of the optical fiber may be disposed at a focus of the first lens. The second lens may receive and focus parallel light. The third lens may output parallel light with the same focus as a focus location of the second lens by which a size of beam is adjusted. A change in distance between the second lens and the third lens may result in a change in size of the beam.

As set forth above, an antenna alignment apparatus according to an example embodiment may provide easy alignment of an antenna using a bearing structure and a laser focal length adjustment structure.

In addition, an antenna alignment apparatus according to an example embodiment may provide initial alignment by mounting a first antenna alignment apparatus on a dummy mast and rotating an optical fiber collimator with a bearing structure to match central axes of the first antenna alignment apparatus and the optical fiber collimator.

In addition, an antenna alignment apparatus according to an example embodiment may provide alignment of an elevation angle and an azimuth angle of a transmitting antenna jig, by mounting a first antenna alignment apparatus on the transmitting antenna jig, mounted on the receiving antenna mast to be rotatable through a bearing, and rotating the transmitting antenna jig through a bearing structure.

In addition, an antenna alignment apparatus may control laser beam to converge at a single point by mounting a first antenna alignment apparatus on a transmitting antenna jig, mounted on a receiving antenna mast to be rotatable through a bearing, and adjusting a focal length of an optical fiber collimator of the first antenna alignment apparatus.

Although the present disclosure and its advantages have been described in detail, it should be understood that various changes, substitutions and alterations can be made herein without departing from the spirit and scope of the disclosure as defined by the following claims.

What is claimed is:

1. An antenna alignment apparatus comprising a first antenna alignment unit,
  wherein
  the first antenna alignment unit comprises:
    a flange coupled to a transmit antenna jig providing two-axis rotational motion;
    a first bearing coupled to the flange;
    a cylinder inserted into the first bearing to rotate;
    an optical fiber collimator inserted into and aligned with the cylinder and having a variable focal length;
    an optical fiber mounted on the optical fiber collimator; and
    a plurality of screws contacting an external side surface of the optical fiber collimator through an external side surface of the cylinder and aligning a central axis of the optical fiber collimator and a central axis of the cylinder.

2. The antenna alignment apparatus as set forth in claim 1, wherein
  the optical fiber collimator comprises:
    a first cylinder;
    a second cylinder connected to the first cylinder and having an aligned central axis;
    a first lens disposed inside the first cylinder;
    a second lens disposed inside the second cylinder; and
    an optical fiber adapter disposed at one end of the first cylinder, and
  the optical fiber has one end mounted on the optical fiber adapter.

3. The antenna alignment apparatus as set forth in claim 2, wherein
  the end of the optical fiber is disposed at a focus of the first lens.

4. The antenna alignment apparatus as set forth in claim 2, wherein
  a distance between the first cylinder and the second cylinder is variable.

5. The antenna alignment apparatus as set forth in claim 2, further comprising:
  a third cylinder disposed between the first cylinder and the second cylinder,
  wherein
  one of the first cylinder and the second cylinder has a variable distance from the third cylinder.

6. The antenna alignment apparatus as set forth in claim 1, further comprising:
  a second antenna alignment unit disposed to be spaced apart from the optical fiber collimator,
  wherein
  the second antenna alignment unit comprises;
    a reflector disposed to be perpendicular to a central axis of the optical fiber collimator; and
    a reflector support portion supporting the reflector.

7. The antenna alignment apparatus as set forth in claim 1, further comprising:

a transmit antenna mast;
    a transmit antenna jig coupled to the transmit antenna mast; and
    a bearing by which the transmit antenna jig provides rotational motion to the transmit antenna mast.

8. The antenna alignment apparatus as set forth in claim 6, further comprising:
  a receive antenna mast; and
  a receive antenna jig coupled to the receive antenna mast, wherein
  the second antenna alignment unit is disposed at the receive antenna jig.

9. An antenna alignment method of an antenna alignment apparatus comprising a first antenna alignment unit and a second antenna alignment unit,
  wherein
  the first antenna alignment unit comprises:
    a flange coupled to a transmit antenna jig;
    a first bearing coupled to the flange;
    a cylinder inserted into the first bearing to rotate;
    an optical fiber collimator inserted into and aligned with the cylinder and having a variable focal length; and
    a plurality of screws contacting an external side surface of the optical fiber collimator through an external side surface of the cylinder and aligning a central axis of the optical fiber collimator and a central axis of the cylinder with each other,
  the second antenna alignment unit comprises:
    a reflector disposed to be perpendicular to a central axis of the optical fiber collimator; and
    a reflector support portion supporting the reflector, and
  the antenna alignment method comprises:
    coupling the flange of the first antenna alignment unit to a transmit antenna jig; and
    initially aligning the flange and the transmit antenna jig with each other by adjusting the screws to match a trajectory of laser beam of the optical fiber collimator with a central axis of the cylinder while rotating the cylinder.

10. The antenna alignment method as set forth in claim 9, further comprising:
  coupling the first antenna alignment unit and the transmit antenna jig, initially aligned with each other, to the transmit antenna mast;
  checking trajectory of laser beam of the optical fiber collimator while rotating the transmit antenna jig coupled to the transmit antenna mast through a bearing;
  controlling an elevation angle and an azimuth angle of the transmit antenna jig such that the trajectory of the laser beam of the optical fiber collimator is disposed in a center of the reflector;
  varying a focal length of the optical fiber collimator such that the laser beam of the optical fiber collimator is focused in the center of the reflector; and
  controlling an elevation angle and an azimuth angle of a receive antenna jig on which the reflector is mounted to provide reflected light, reflected from the reflector, to the optical fiber collimator.

11. The antenna alignment method as set forth in claim 10, further comprising:
  removing the first antenna alignment unit from the transmit antenna jig and attaching the transmit antenna reference plane transfer jig, to which the transmit antenna is attached, to the transmit antenna jig;
  removing the second antenna alignment unit from the receive antenna jig and attaching the receive antenna reference plane transfer jig, to which the receive
antenna is attached, to the receive antenna jig; and
providing an electrical signal to the transmit antenna to
radiate electromagnetic waves, and receiving the elec-
tromagnetic waves from the receive antenna and con-
verting the received electromagnetic waves into elec-
trical signals.

12. An antenna alignment apparatus comprising:
a transmit antenna mast;
a transmit antenna jig coupled to the transmit antenna
mast and providing two-axis rotational motion;
a bearing mounted on the transmit antenna mast and
providing rotational motion of the transmit antenna jig
with respect to the transmit antenna mast;
a receive antenna mast; and
a receive antenna jig coupled to the receive antenna mast
and providing two-axis rotational motion.

13. The antenna alignment apparatus as set forth in claim
12, wherein
the transmit antenna jig changes a first elevation angle and
a first azimuth angle, and
the receive antenna jig changes a second elevation angle
and a second azimuth angle.

14. The antenna alignment apparatus as set forth in claim
12, further comprising:
a first antenna alignment unit mounted on the transmit
antenna jig,
wherein the first antenna alignment unit comprises:
a flange coupled to a transmit antenna jig providing
two-axis rotational motion;

14 a first bearing coupled to the flange;
a cylinder inserted into the first bearing to rotate;
an optical fiber collimator inserted into and aligned
with the cylinder and having a variable focal length;
an optical fiber mounted on the optical fiber collimator;
and
a plurality of screws contacting an external side surface
of the optical fiber collimator through an external
side surface of the cylinder and aligning a central
axis of the optical fiber collimator and a central axis
of the cylinder.

15. The antenna alignment apparatus as set forth in claim
14, further comprising:
a second antenna alignment unit mounted on the receive
antenna jig,
wherein the second antenna alignment unit comprises:
a reflector disposed to be perpendicular to a central axis
of the optical fiber collimator; and
a reflector support portion supporting the reflector.

16. The antenna alignment apparatus as set forth in claim
12, further comprising:
a transmit antenna reference plane transfer jig coupled to
the transmit antenna jig;
a transmit antenna coupled to the transmit antenna refer-
ence plane transfer jig;
a receive antenna reference plane transfer jig coupled to
the receive antenna jig; and
a receive antenna coupled to the receive antenna reference
plane transfer jig.

* * * * *